United States Patent [19]

Hénigûe

[11] Patent Number: 4,909,097
[45] Date of Patent: Mar. 20, 1990

[54] STEERING WHEEL IN PARTICULAR FOR A MOTOR VEHICLE

[75] Inventor: Christain Hénigûe, Delle, France

[73] Assignee: ECIA - Equipements Et Composants Pour l'Industrie Automobile, Audincourt, France

[21] Appl. No.: 181,958

[22] Filed: Apr. 15, 1988

[30] Foreign Application Priority Data

Apr. 17, 1987 [FR] France ................................ 87 05539

[51] Int. Cl.⁴ ............................................. B62D 1/04
[52] U.S. Cl. ...................................... 74/552; 280/750
[58] Field of Search ......................... 74/552, 556, 492; 280/777, 778, 750; 29/159 B

[56] References Cited

U.S. PATENT DOCUMENTS

| 3,167,974 | 2/1965 | Wilfert | 74/552 |
| 3,546,964 | 12/1970 | Barenyi et al. | 74/552 |
| 3,570,326 | 3/1971 | Albrecht et al. | 74/552 |
| 3,589,210 | 6/1971 | Norman | 74/552 |
| 3,596,532 | 8/1971 | Wilfert | 74/552 |
| 3,641,834 | 2/1972 | Barenyi | 74/492 |
| 3,771,379 | 11/1973 | Rohrbach | 74/552 X |
| 3,901,091 | 8/1975 | Wenninger | 74/552 |
| 3,938,404 | 2/1976 | Murase et al. | 74/552 X |
| 3,977,271 | 8/1976 | Becker | 74/552 |
| 4,336,868 | 6/1982 | Wilson et al. | 188/376 |
| 4,419,908 | 12/1983 | Reikowski | 74/552 |
| 4,612,425 | 9/1986 | Kanai et al. | 74/552 X |

FOREIGN PATENT DOCUMENTS

| 0130009 | 1/1985 | European Pat. Off. | 74/552 |
| 1912528 | 2/1971 | Fed. Rep. of Germany | 74/552 |
| 2254960 | 7/1975 | France | 74/552 |
| 2357412 | 2/1978 | France | 74/552 |
| 2401051 | 3/1979 | France | 74/552 |
| 2463708 | 2/1981 | France | 74/552 |
| 553149 | 12/1956 | Italy | 74/552 |

Primary Examiner—Vinh Luong
Attorney, Agent, or Firm—Sughrue, Mion, Zinn, Macpeak and Seas

[57] ABSTRACT

The steering wheel is of the type comprising a rim (2), at least one connecting arm (3), an impact energy absorbing element (4) and a hub (5). The energy absorbing element is a tubular element (4) of a composite material interposed between the at least one arm (3) and the hub 5, one of the ends of the tubular element being fixed to the corresponding end of the at least one arm (3), while the other end of the tubular element (4) is fixed on the hub (5).

3 Claims, 1 Drawing Sheet

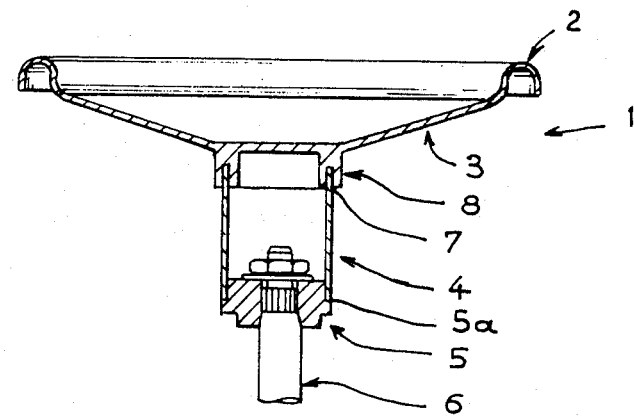
FIG.1
FIG.2
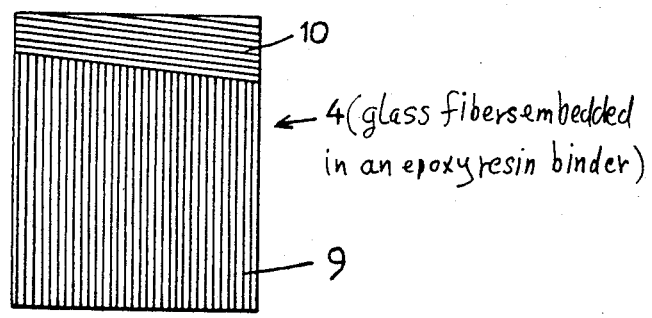
4 (glass fibers embedded in an epoxy resin binder)

STEERING WHEEL IN PARTICULAR FOR A MOTOR VEHICLE

BACKGROUND OF THE INVENTION

The present invention relates to a steering wheel in particular for a motor vehicle.

There exists a constant desire to improve the safety of motor vehicle users.

For example, motor vehicles are equipped with various means for absorbing as far as possible the kinetic energy of the body of the users in the event of impact so as to avoid serious body injury.

The driver of the vehicle is particularly exposed to this type of problem owing to the presence of the steering wheel which might cause relatively considerable damage.

There have therefore been developed in the prior art various devices whereby either the steering wheel or the steering column itself deforms for absorbing the shock.

Thus, for example, an arrangement is known from the European Pat. No. 0 130 009 for absorbing energy, for example in a motor vehicle steering column, this column having two telescopic parts which are maintained in position by a deformable sleeve which deforms in the event of impact and permits one of the parts of the steering column to slide in the other part and thus absorb a part of the impact energy.

A safety steering column for a motor vehicle is also known from the document FR-2 244 658 (corresponding to U.S. Pat. No. 3,934,987) which comprises a steering shaft which is permanently deformable under the action of the forces applied when absorbing energy and is provided with means which produce, for a given critical load, a deformation of the steering shaft. The steering shaft is shaped, at least in one region, in the known manner in the form of a helix whose coils have a diameter which is distinctly larger than the diameter of the non-deformed part of the steering shaft.

The document FR-2 254 960 also discloses a safety steering wheel whose frame comprises, welded on each side of a central hub, two steel branches which are bent substantially in the shape of an S in the vicinity of their end welded to the hub, and are welded at their other end to the steel frame ring of the steering wheel, said branches subtending an angle at the centre in the neighbourhood of 30°.

However, all of these devices have a number of drawbacks, in particular as concerns their structure and their utilization in a motor vehicle.

SUMMARY OF THE INVENTION

An object of the invention is therefore to overcome these drawbacks by providing a steering wheel which is simple, reliable and is of a cost price which is as low as possible and which absorbs in an effective manner the impact energy of the body of the driver.

The invention therefore provides a steering wheel in particular for a motor vehicle of the type comprising a rim, at least one connecting arm, means for absorbing impact energy, and a hub, wherein the energy absorbing means comprise a tubular element of composite material interposed between said at least one arm and said hub, one of the ends of said element being connected to the corresponding end of said at least one arm, while the other end of said element is fixed on said hub, and the corresponding end of said at least one arm is connected to a connection plate having a groove in which the corresponding end of said tubular element is engaged.

According to one embodiment, the tubular element comprises three reinforcing layers of fibres extending in a direction parallel to the axis of said element and alternating in pairs with three reinforcing layers of fibers wound along the circumference of said tubular element, said layers of fibres being embedded in a binder and the reinforcing layers of fibres being in adjoining relation to one another.

A better understanding of the invention will be had from the following description which is given solely by way of example with reference to the accompanying drawing, in which:

BRIEF DESCRIPTION OF THE DRAWING

FIG. 1 is a sectional view of a steering wheel according to the invention, and

FIG. 2 shows the distribution of the fibres in a tubular element which is part of the construction of the steering wheel according to the invention.

DETAILED DESCRIPTION OF A PREFERRED EMBODIMENT

FIG. 1 shows a steering wheel 1 in particular for a motor vehicle comprising in the known manner a rim 2, for example an annular rim, at least one connecting arm 3, energy absorbing means 4 and a hub 5 cooperating with a steering column 6 of the motor vehicle.

According to the invention, the energy absorbing means 4 comprise a tubular element composed of a composite material and interposed between said at least one arm 3 and the hub 5.

One of the ends of this tubular element is engaged in a groove 7 in a connecting plate 8 to which is fixed the corresponding end of the arm 3, while the other end of the tubular element is fixed on the hub 5 in bearing relation to a centering and positioning shoulder 5a.

As shown in the drawing, the steering wheel may have more than one arm 3, for example two arms, for connecting the rim to the rest of the steering wheel.

As illustrated in FIG. 2, the tubular element 4 comprises layers of reinforcing fibres extending in a direction parallel to the axis of the element, such as the fibres 9, which alternate in pairs with layers of reinforcing fibres, such as the fibres 10, which are wound along the circumference of the tubular element. These reinforcing layers are embedded in a binder and the fibres are preferably in adjoining relation to one another. Advantageously, the element comprises three layers of fibre parallel to the axis of the element which alternate in pairs with three layers of fibres wound along this circumference of the element.

The reinforcing fibres may be, for example, formed by fibres of glass and the binder by an epoxy resin, the assembly being subjected to a heat treatment, for example at 150° C. for 1.5 hours, so as to harden the resin.

It will be understood that other constituents may be used.

In the event of shock or impact, the kinetic energy of the body of the driver is absorbed by the tubular element 4 which yields under the stress and consequently absorbs this energy.

What is claimed is:

1. A steering wheel, in particular for a motor vehicle said steering wheel comprising a rim, at least one connecting arm, impact energy absorbing means, a hub, said energy absorbing means comprising a tubular element of a composite material having a longitudinal axis and interposed between an adjacent end of said at least one arm and said hub, said element having a first end and a second end opposed to said first end, said second end being fixed on said hub, and a connecting plate comprising a groove and fixed to said adjacent end of said at least one arm, said first end of said tubular element being engaged in said groove; wherein said hub includes a shoulder for centering and positioning said second end of said tubular element; wherein said tubular element comprises a plurality of first layers of reinforcing fibres extending in a direction substantially parallel to said longitudinal axis of said tubular element and a plurality of second layers of reinforcing fibres wound along substantially the circumference of said tubular element, said first tubular layers alternating in pairs with said second layers, said layers of fibres being embedded in a binder and said reinforcing fibres being in adjoining relation to one another.

2. A steering wheel according to claim 1, wherein there are three of said first layers and three of said second layers.

3. A steering wheel according to claim 1, wherein said reinforcing fibres are fibres of glass and said binder is an epoxy resin.

* * * * *